(12) United States Patent
Hessling-Von Heimendahl (10) Patent No.: US 11,097,854 B2
(45) Date of Patent: Aug. 24, 2021

(54) AIRCRAFT LIGHT AND AIRCRAFT LIGHT ASSEMBLY

(71) Applicant: Goodrich Lighting Systems GmbH, Lippstadt (DE)

(72) Inventor: Andre Hessling-Von Heimendahl, Koblenz (DE)

(73) Assignee: GOODRICH LIGHTING SYSTEMS GMBH, Lippstadt (DE)

( * ) Notice: Subject to any disclaimer, the term of this patent is extended or adjusted under 35 U.S.C. 154(b) by 25 days.

(21) Appl. No.: 16/419,423

(22) Filed: May 22, 2019

(65) Prior Publication Data
US 2019/0359349 A1    Nov. 28, 2019

(30) Foreign Application Priority Data
May 22, 2018   (EP) .................................... 18173607

(51) Int. Cl.
| | |
|---|---|
| *B64D 47/04* | (2006.01) |
| *F21S 43/14* | (2018.01) |
| *H05B 47/11* | (2020.01) |
| *H05B 45/18* | (2020.01) |
| *F21W 107/30* | (2018.01) |

(52) U.S. Cl.
CPC .............. *B64D 47/04* (2013.01); *F21S 43/14* (2018.01); *H05B 45/18* (2020.01); *H05B 47/11* (2020.01); *B64D 2203/00* (2013.01); *F21W 2107/30* (2018.01)

(58) Field of Classification Search
CPC ...... B64D 47/04; B64D 2203/00; F21S 43/14
See application file for complete search history.

(56) References Cited

U.S. PATENT DOCUMENTS

| | | | |
|---|---|---|---|
| 5,742,253 A | * | 4/1998 | Conroy .................... H01Q 3/22 342/354 |
| 9,176,314 B1 | | 11/2015 | Hartwell |
| 9,295,114 B2 | | 3/2016 | Trinschek et al. |
| 9,572,223 B1 | | 2/2017 | Mula et al. |
| 9,655,186 B2 | | 5/2017 | Hessling Von Heimendahl et al. |
| 9,919,810 B2 | | 3/2018 | Hellsling Von Heimendahl |
| 2016/0345401 A1 | * | 11/2016 | Hessling-Von Heimendahl ......... B60Q 1/1423 |

(Continued)

FOREIGN PATENT DOCUMENTS

EP        3095641 A1    11/2016

OTHER PUBLICATIONS

Extended European Search Report for International Application No. 18173607.5 dated Oct. 12, 2018, 7 pages.

*Primary Examiner* — Joseph L Williams
(74) *Attorney, Agent, or Firm* — Cantor Colburn LLP (57) ABSTRACT

An aircraft light comprises at least one light source; at least one sensor, an operating mode selector, and a transmitter. The sensor is configured for detecting current operational conditions and providing at least one corresponding sensor signal. The operating mode selector configured for determining a suitable light emission of the at least one light source based on the at least one sensor signal. The operating mode selector is further configured for determining the amount of electrical power needed for generating the determined light emission. The transmitter configured for transmitting a power request signal indicating the determined amount of electrical power to a power supply.

12 Claims, 4 Drawing Sheets

(56) References Cited

U.S. PATENT DOCUMENTS

2017/0073083 A1\* 3/2017 Hessling-Von Heimendahl ......... B64D 47/06
2018/0084620 A1 3/2018 Klein et al.

\* cited by examiner

AIRCRAFT LIGHT AND AIRCRAFT LIGHT ASSEMBLY

FOREIGN PRIORITY

This application claims priority to European Patent Application No. 18173607.5 filed May 22, 2018, the entire contents of which is incorporated herein by reference.

BACKGROUND

The present invention relates to aircraft lighting. It in particular relates to an aircraft light and to an aircraft light assembly comprising at least one aircraft light and an electric power supply configured for supplying electric power to the at least one aircraft light.

Almost all aircraft are equipped with lights, especially exterior lights. In particular large passenger air planes are provided with a wide variety of exterior lights. The exterior lights are provided for a wide variety of different purposes, such as for allowing the passengers and/or air crew to view the outside, for passive visibility, for signaling purposes, etc. Examples of such exterior lights are navigation lights, also referred to as position lights, beacon lights, anti-collision lights, wing scan lights, take-off lights, landing lights, taxi lights, runway turn-off lights, etc. Aircraft lights may be operated in different operating modes requiring different amounts of electric power.

It therefore would be beneficial to provide an aircraft light and an aircraft light assembly that allows for an efficient power supply to the aircraft light.

SUMMARY

Exemplary embodiments of the invention include an aircraft light, in particular an exterior aircraft light, with at least one light source. The aircraft light comprises at least one sensor, an operating mode selector, and a transmitter. The sensor is configured for detecting current operational conditions of the aircraft light and providing at least one corresponding sensor signal. The operating mode selector is configured for determining a suitable light emission of the at least one light source based on the at least one sensor signal, and for determining the amount of electric power needed for generating the determined light emission. The transmitter is configured for transmitting a power request signal indicating the necessary amount of electric power determined by the operating mode selector to an electric power supply. The electric power supply is an external electric power supply, which is not integrated with but spatially separated from the aircraft light.

Exemplary embodiments of the invention further include an aircraft light assembly comprising at least one aircraft light according to an exemplary embodiment of the invention and an electric power supply configured for supplying electric power to the at least one aircraft light. The electric power supply comprises a receiver configured for receiving a power request signal provided by the at least one aircraft light, and a control circuit configured for controlling the electric power supplied to the at least one aircraft light according to the received power request signal. The electric power supply is spatially separated from the at least one aircraft light.

Exemplary embodiments of the invention also include an aircraft, in particular an airplane or a helicopter, comprising at least one aircraft light assembly according to an exemplary embodiment of the invention. The at least one aircraft light may be at least one of a landing light, a taxi light, a runway turn-off light, and a take-off light, or a multi-purpose exterior aircraft light combining the functionality of at least two of a landing light, a taxi light, a runway turn-off light and a take-off light.

An aircraft light according to an exemplary embodiment of the invention is configured to be operated in a plurality of different operating modes.

The different operating modes may include modes in which the at least one light source is operated in a dimmed state, i.e. in a state in which it emits only a portion of the maximum light intensity it is able to emit when operated with full power.

An aircraft light according to an exemplary embodiment of the invention may comprise a plurality of identical or different light sources. In such a configuration, a subset of a plurality of light sources may be predefined for each operating mode. In other words, for each operating mode, a fixed correlation exists between the particular operating mode and a particular subset of the plurality of light sources. The predefined subset of light sources, which are switched on for a particular operating mode, is referred to as the respective selected subset for that particular operating mode. A particular operating mode corresponds to a particular subset of the plurality of light sources to be switched on. The term subset refers to a subgroup of the plurality of light sources of the light source group, with the subset comprising at least one light source of the light source group. In other words, the term subset refers to a particular selection of the plurality of light sources. Accordingly, in any given operating mode, at least one light source is switched on. It is also possible that two or more of the plurality of light sources are switched on in each operating mode and/or that two or more of the plurality of light sources are not switched on in each operating mode.

The operating modes differ from each other in that respectively different subsets of light sources are switched on in each of the operating modes. The operating modes may further differ from each other in that in that some light sources are operated in a dimmed state in at least one of the operating modes.

As a result, the different operating modes all have different output light intensity distributions. The term operating modes refers to the modes of operation that the aircraft light may assume during the operation of the aircraft, i.e. during all the phases of a flight, including the taxiing to/from the gate and on the runway.

According to exemplary embodiments of the invention, only the amount of electric power needed for operating the at least one aircraft light in the currently activated operating mode or an amount of electric power slightly exceeding the needed electric power, as determined by the operating mode selector, is supplied to the at least one aircraft light. As a result, the amount of waste heat generated at the at least one aircraft light, which needs to be dissipated, is considerably reduced.

By reducing the amount of waste heat, the efficiency of the aircraft light assembly is increased, and the cooling capacity provided at the at least one aircraft light may be reduced. Further, the thermal stress for components of the at least one aircraft light, in particular the at least one light source, is reduced. This may prolong the lifetime of these components.

According to an embodiment, the operational conditions detected by the at least one sensor include flight and/or environmental conditions. This in particular may include detecting whether the aircraft is rising, in particular starting, or descending, in particular landing, the current height of the aircraft and/or the current orientation of the aircraft, defined by one or more of a pitch angle, a yaw angle, and a roll angle, in space. This information allows the operating mode selector to determine a light emission which is well adapted to the respective operational state of the aircraft. The light emission in particular may be adapted to the current orientation of the aircraft in space.

According to an embodiment, the operational conditions detected by the at least one sensor include parameters related to the environment close to the aircraft. This e.g. may include the temperature outside the aircraft, the humidity of the air outside the aircraft and/or the air pressure outside the aircraft. Detecting these parameters allows adjusting the light emission to these external parameters, in particular to parameters representing the current weather conditions. For example, in case of foggy weather indicated by a high humidity of the air, the intensity of the light emission may be reduced in order to avoid the pilot from being blinded by light reflected by the fog.

According to an embodiment, the at least one sensor is arranged inside a housing of the aircraft light. Alternatively or additionally, at least one sensor may be arranged outside the housing of the aircraft light. The at least one sensor further may include sensors arranged in some distance from the aircraft light, e.g. within the fuselage of the aircraft and/or close to or within the engines of the aircraft. The position of the at least one sensor in particular may be selected according to the parameters to be measured by the respective sensor.

According to an embodiment, the aircraft light is configured for being connected to an electric power supply by means of at least one electric power line.

According to an embodiment, the transmitter is configured for transmitting the power request signal via a dedicated data line, i.e. a data line provided separately from the electric power line, or via a wireless data connection. Providing a separate data line avoids interference between the electric power supplied to the aircraft light and the data signal(s). A wireless data avoids said interference without the need of providing an additional data line.

According to an embodiment, the transmitter is configured for transmitting the power request signal via the at least one electric power line. Using at least one electric power line for data transmission avoids the need of providing at least one additional data line.

The transmitter in particular may be configured for generating and transmitting a high frequency signal, such as a signal of a frequency in the range of 1.75 MHz to 13 MHz, which is transmitted to a corresponding receiver via an electric power line. The electric power is usually supplied as a direct current or as an alternating current having a low frequency, in particular a frequency of less than 100 Hz. Using a high-frequency signal therefore allows a reliable transmission of the data via the electric power line without interfering with the power transmission. When using a frequency in the range of 1.75 MHz to 13 MHz, as mentioned above, a bit rate of 9.6 to 115 Kbps and a response time of less than 50 ms may be achieved. In this way, a very fast signal transfer between the aircraft light and the power supply may be achieved.

According to an embodiment, the power request signal includes parameters indicating at least one of an electric voltage, an electric current, a frequency, and a duty cycle of the electric power to be supplied to the aircraft light. The power request signal may also comprise any subset of these parameters or all of these parameters. Transferring a power request signal comprising at least one of these parameters allows the electric power supply to adapt the electric power supplied to the aircraft light according to the respective needs. Adjusting the voltage, the electric current, the frequency and/or the duty cycle of the electric power supplied to the aircraft light all are potential means for adjusting the electric power supplied to the aircraft light. These means may be applied separately or in any desired combination.

According to an embodiment, the transmitter is configured for transmitting additional data, i.e. data in addition to the information included in the power request signal. Additionally or alternatively, the aircraft light may comprise a memory configured for storing data. The stored data may include information included in the power request signal and/or additional data.

The data stored within the memory and/or transmitted by the transmitter may include operation log data documenting the operational history of the aircraft light source and/or information about the health of the at least one light source.

The stored data and/or the transmitted data may be used for maintenance purposes and/or for error tracing. The data in particular may be used for determining whether at least one of the light sources has reached the end of its lifetime and therefore needs to be replaced.

According to an embodiment, the aircraft light further comprises a transceiver configured for receiving a control signal. In such an embodiment, the operating mode selector is configured for modifying the light emission determined by the operating mode selector according to a received control signal.

Such a configuration allows overriding the power request signal generated by the operating mode selector with an external control signal. The external control signal in particular may be or may be based on a manual control signal generated by the pilot. This allows the pilot to manually adjust the intensity of the light emitted by the aircraft light, e.g. in case he/she desires to increase the intensity of the light emission under special circumstances despite the risk of being blinded by reflected light. Alternatively, the pilot may desire to reduce the light intensity below the light intensity calculated by the operating mode selector because he is blinded by the light emission determined by the operating mode selector.

Alternatively or additionally to a manual input, the external control signal may be generated by a flight computer of the aircraft, which is not part of the aircraft light.

The transceiver may be configured for receiving the control signal via the at least one electric power line, via at least one separate data line or via a wireless data connection. When the at least one electric power line is used for the data transmission, no additional data lines need to be provided. Providing a separate data line avoids interference between the electric power supplied to the aircraft light and the data signal. A wireless data avoids interference between the electric power supply and the data signal without the need of providing at least one additional data line.

The control signal may be transmitted similar to the power request signal as a high frequency signal over the at least one electric power line. Alternatively, the control signal may be transmitted by controlling the electric power supplied to the aircraft light ignoring the power request signal provided by the controller.

For example, the electric power supply may supply full electric power to the aircraft light due to a control signal, which may be based on a manual request issued by the pilot, although the operating mode selector calculated a smaller electric power demand. By receiving full electric power, the controller recognizes that operating the at least one light source with full power is requested. In consequence, the power request signal provided by the operating mode selector is ignored (overridden) and the aircraft light is operated with full electric power emitting light having the maximum possible intensity.

Similarly, the electric power supplied by the electric power supply may be set lower than the electric power requested by the power request signal in order to operate the aircraft light in an operating mode in which it emits light with an intensity which is lower than the intensity determined by the operating mode selector.

The control signal may also comprise further commands, such as on/off commands for the aircraft light.

According to an embodiment, the at least one light source is or comprises at least one LED. LEDs provide reliable light sources having a long lifetime and a high efficiency. The at least one light source in particular may include LEDs emitting light having different wavelengths (colors) and/or intensities.

Switching between different operating modes in particular may include changing the number and/or the type of light sources/LEDs switched on.

According to an embodiment, the electric power supply is arranged in a thermally controlled area of the aircraft, in particular in a thermally controlled electronic bay. In such a thermally controlled area, the temperature is controlled, e.g. by a climate control, so that it varies only within a predetermined thermal range extending between an upper temperature limit and a lower temperature limit. Operating the electric power supply within a predetermined thermal range enhances the operational stability and reliability of the electric power supply. It further may prolong the lifetime of the electric power supply.

As the aircraft lights are usually provided as exterior aircraft lights located at an exterior surface of the aircraft, the aircraft lights generally cannot be arranged in a thermally controlled area of the aircraft. Instead, the temperatures of aircraft lights vary over a wide range depending e.g. on the current weather and flight conditions, including e.g. the current height of the aircraft.

The temperatures of the aircraft lights additionally depend on their respective operational state. I.e. the temperature of an aircraft light increases when it is operated and its temperature usually is higher when operated in a state emitting light having a high intensity than when operated in a state emitting light of a low(er) intensity.

According to an embodiment the aircraft light comprises a mounting portion configured for being mounted to a corresponding supporting structure of an aircraft. The mounting portion in particular may be configured for being mounted to the fuselage, to a wing, or to a gear of the aircraft. The other components of the aircraft light, as discussed herein, may be mounted to the mounting portion or to one or more additional support structures, mounted to the mounting portion.

BRIEF DESCRIPTION OF THE DRAWINGS

Exemplary embodiments of the invention are described in detail below with reference to the figures.

DETAILED DESCRIPTION

Figure 1:
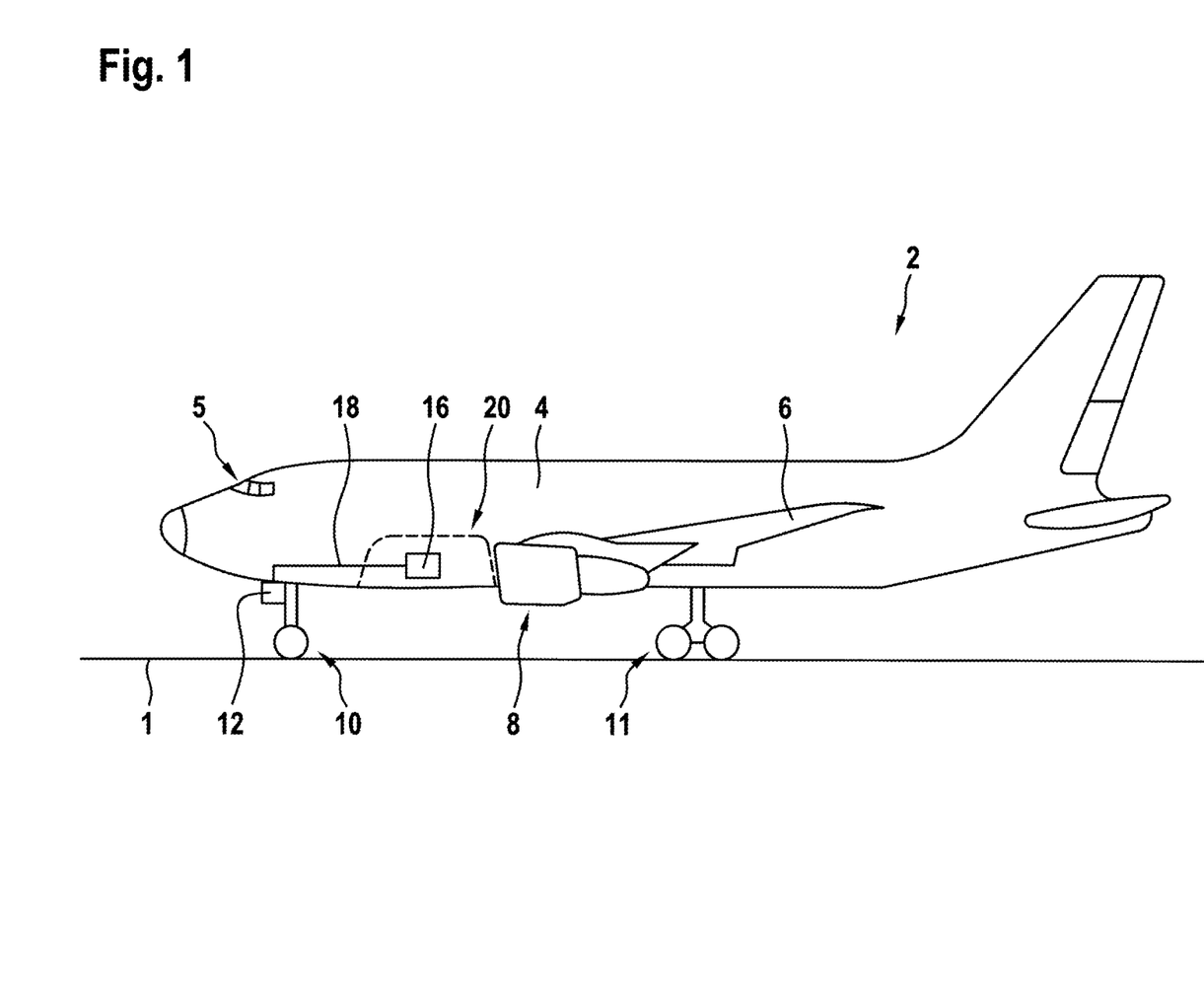
FIG. 1 shows a side view of an airplane comprising exterior aircraft lights according to exemplary embodiments of the invention.

FIG. 1 shows a side view of an aircraft 2 standing on a runway 1. The aircraft 2 comprises aircraft lights 12, 14, in particular exterior aircraft lights 12, 14, according to exemplary embodiments of the invention, and FIG. 2 shows a top view of said aircraft 2.

Figure 2:
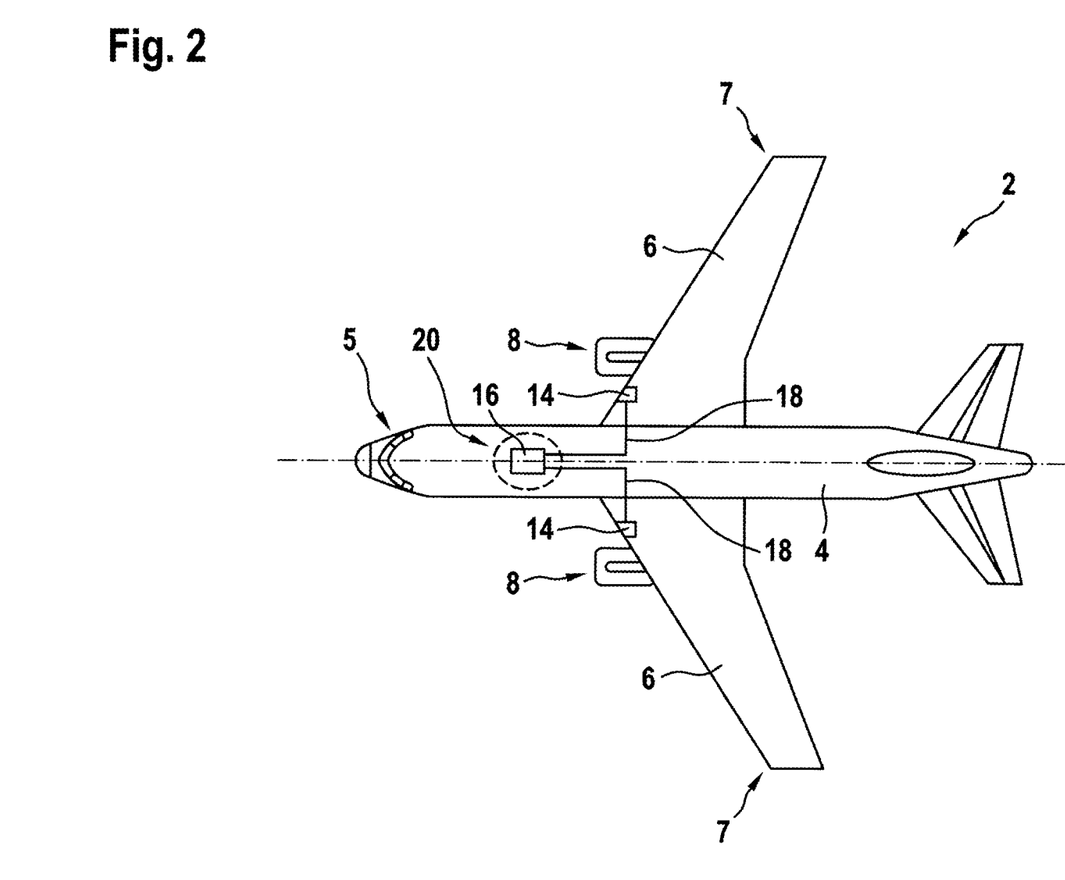
FIG. 2 shows a top view of the airplane depicted in FIG. 1.
Figure 3:
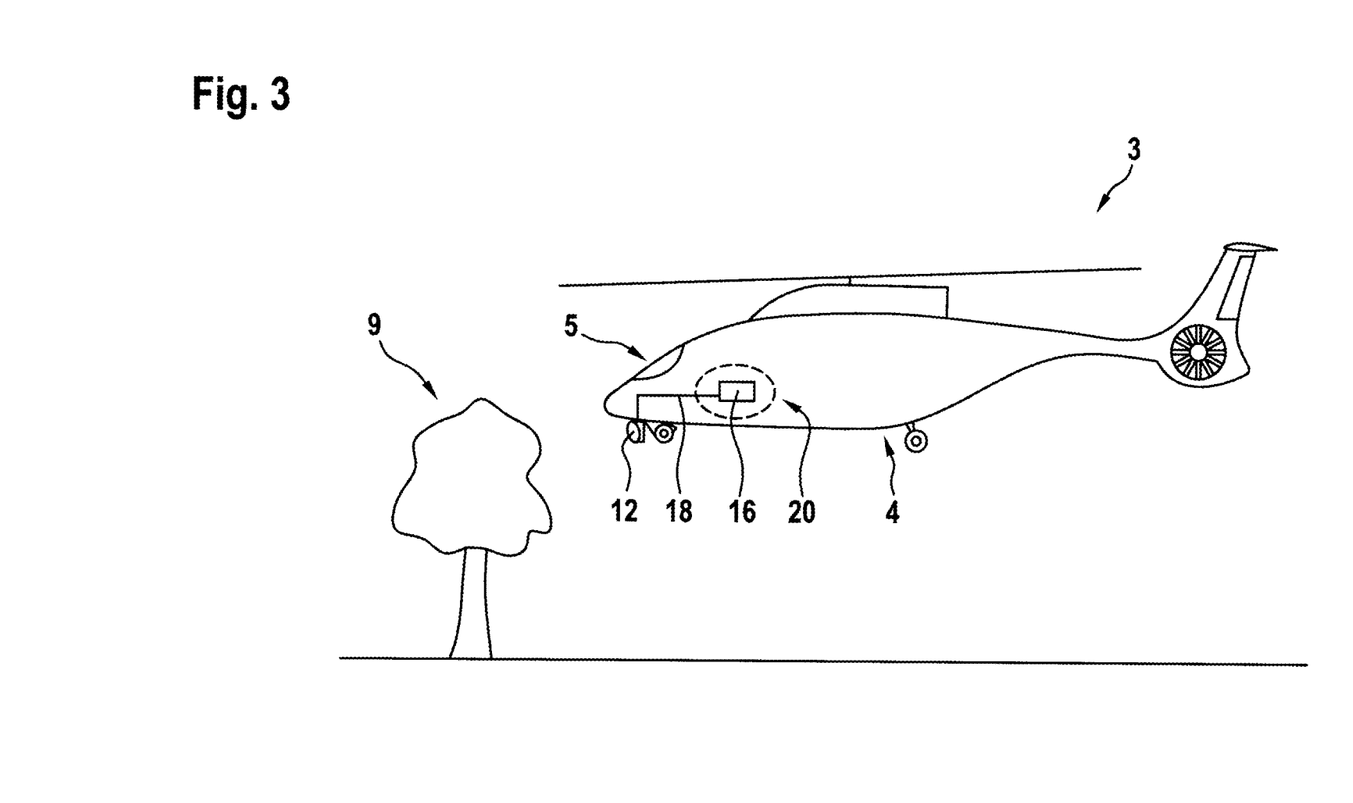
FIG. 3 shows a side view of a helicopter comprising an exterior aircraft light according to exemplary embodiments of the invention.

In the embodiment shown in FIGS. 1 and 2, the aircraft 2 is an airplane 2 comprising a fuselage 4 including a cockpit 5 and two wings 6 extending from the fuselage 4. A jet engine 8 is mounted to each of the wings 6. The skilled person, however, will understand that the invention may be applied to aircraft 2 comprising propellers (not shown) instead of jet engines 8 and to aircraft 2 in which the engine(s) 8 or propeller(s) are mounted to the fuselage 4 instead of the wings 6. The skilled person will further understand that exemplary embodiments also may include exterior aircraft lights 12 mounted to a helicopter 3, as depicted in FIG. 3.

The aircraft/airplane 2 shown in FIGS. 1 and 2 comprises a front running gear 10 and at least one main running gear 11.

A first exterior aircraft light, e.g. a landing or take-off light, 12 is mounted to the front running gear 10. Two second exterior aircraft lights 14, e.g. runway-turnoff lights or taxi lights, are mounted to or integrated with each of the wings 6. In particular, the second exterior aircraft lights 14 are integrated into respective wing root portions of the wings 6. The second aircraft lights 14 are not visible in FIG. 1, as they are covered by the engine 8 and/or the fuselage 4. The first aircraft light 12 is not visible in FIG. 2, as it is covered by the fuselage 4 of the aircraft 2.

Although in the embodiment depicted in FIGS. 1 and 2, the second aircraft lights 14 are positioned between the fuselage 4 and the engines 8, the skilled person understands that aircraft lights 12, 14 may be positioned also outside the engines 8, in particular close to outer tip ends 7 of the wings 6.

Alternatively or additionally, exterior aircraft lights according to exemplary embodiments of the invention may be mounted to at least one of the main running gear 11 and/or to the fuselage 4 of the aircraft 2.

Each of the exterior aircraft lights 12, 14 may be one of a landing light, a taxi light, a runway turn-off light, and a take-off light. Each of the exterior aircraft lights 12, 14 also may be a multi-purpose exterior aircraft light 12, 14 combining the functionality of at least two of a landing light, a taxi light, a runway turn-off light and a take-off light.

Each of the exterior aircraft lights 12, 14 is electrically connected via at least one electric power line 18 to an electric power supply 16. In the embodiments depicted in FIGS. 1 to 3, the electric power supply 16 is arranged in the fuselage 4 of the aircraft 2, 3. Alternatively, the electric power supply 16 may be arranged in one of the wings 6 of the aircraft 2.

The electric power supply 16 may be a central electric power supply 16 configured for supplying electric power to all the exterior aircraft lights 12, 14 of an aircraft 2, 3. Alternatively, a plurality of electric power supplies 16 may be provided within the aircraft 2, 3, each electric power supply 16 being configured for supplying power to one or more of the exterior aircraft lights 12, 14 of the aircraft 2, 3.

The at least one electric power supply 16 in particular may be arranged in a thermally controlled area 20 of the aircraft 2, 3, in particular in a thermally controlled electronic bay 20. In a thermally controlled area 20, the temperature is controlled, e.g. by a climate control, so that it varies only within a predetermined thermal range extending between an upper temperature limit and a lower temperature limit. For example, the thermally controlled electronic bay may be operated in a tightly controlled temperature range around 20° C., such as in a range between 15° C. and 25° C. Operating the electric power supply 16 within a predetermined thermal range enhances the operational stability and reliability of the electric power supply 16. It further may prolong the lifetime of the electric power supply 16.

As exterior aircraft lights 12, 14 are usually located at an exterior surface of the aircraft 2, 3, they usually cannot be arranged in a thermally controlled area 20 of the aircraft 2, 3. Instead, the temperatures of the exterior aircraft lights 12, 14 may vary over a wide range depending on the current weather and flight conditions, such as the current height of the aircraft 2, 3. The temperatures of the exterior aircraft lights 12, 14 additionally depend on their respective operational state.

As mentioned before, at least one of the exterior aircraft lights 12, 14 may be a multi-functional light, which may be operated in at least two different operating modes. The different operating modes may require different amounts of electric power.

An exterior aircraft light 12, 14 according to an exemplary embodiment of the invention for example may be switchable between a landing light mode, in which the exterior aircraft light 12, 14 operates as a landing light, and a runway-turnoff light mode, in which the exterior aircraft light 12, 14 operates as runway-turnoff light after the aircraft 2, 3 has landed.

Additionally or alternatively, the exterior aircraft light 12, 14 may be a dynamic aircraft headlight 12, 14 configured to be selectively operated in one of a plurality of operating modes. In each of the plurality of operating modes, a respective selected subset of a plurality light sources 26 (see FIG. 4) may be switched on so that a different output light intensity distribution is emitted by the dynamic aircraft headlight 12, 14 in each of the plurality of operating modes.

For example, an exterior aircraft light 12, 14 may be dimmed reducing the intensity of the light emitted by the exterior aircraft light 12, 14 in order to avoid blinding the pilot by light reflected by fog, by wet surfaces, such as a wet runway 1 (see FIG. 1), and/or by objects 9, such as trees (see FIG. 3), located close to the aircraft 2, 3 and being illuminated by the exterior aircraft light 12, 14.

Switching the operation of the exterior aircraft light 12, 14 between different operating modes may result in different power demands of the exterior aircraft light 12, 14.

If the same amount of electric power is supplied to the exterior aircraft lights 12, 14 in every operating mode, excess power, i.e. electric power not needed for operating the exterior aircraft lights 12, 14 in the respective operating mode, is converted into waste heat which needs to be dissipated, e.g. by an appropriate cooling device.

Dissipating a considerable portion of the supplied electric power as waste heat, however, is inefficient and requires providing sufficiently large cooling capacities/cooling devices. It further results in thermal stress for the components of the exterior aircraft lights 12, 14. Said thermal stress may reduce the lifetime of these components.

Figure 4:
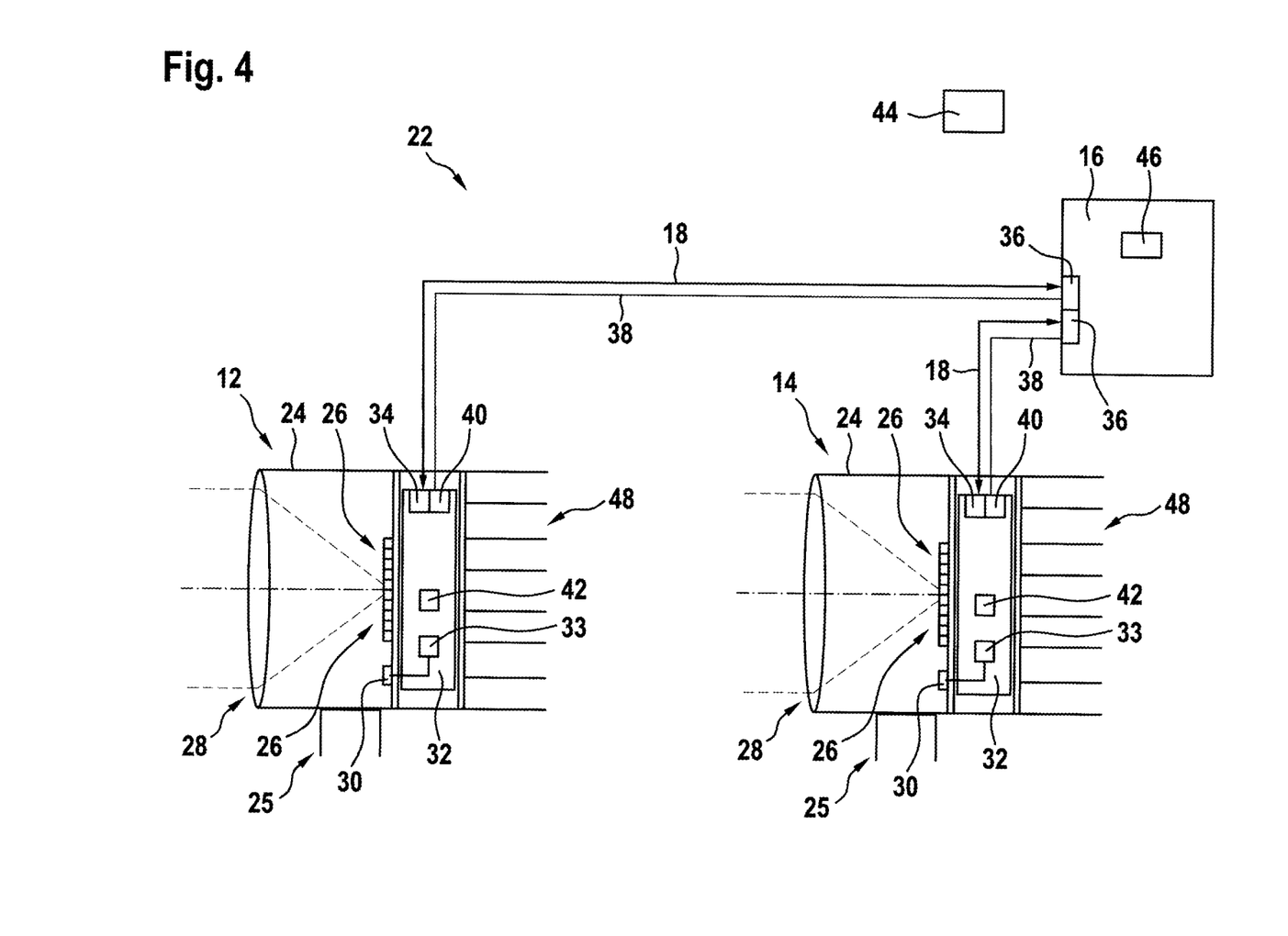
FIG. 4 schematically depicts an aircraft light assembly according to an exemplary embodiment of the invention

FIG. 4 schematically depicts an aircraft light assembly 22 according to an exemplary embodiment of the invention, which is configured for avoiding or at least reducing these issues.

The aircraft light assembly 22 depicted in FIG. 4 comprises an electric power supply 16 and two exterior aircraft lights 12, 14 electrically connected with the electric power supply 16 by an electric power line 18, respectively.

As mentioned before, connecting two exterior aircraft lights 12, 14 to a common electric power supply 16 is only one of a plurality of options. The skilled person will understand that, in other embodiments, only one or more then two exterior aircraft lights 12, 14 may be connected to a common electric power supply 16.

Each of the exterior aircraft lights 12, 14 comprises a housing 24 configured to be attached to or formed integrally with a portion of the aircraft 2, 3. The housing 24 in particular may include amounting portion 25 configured for being mounted to a corresponding supporting structure (not shown) of the aircraft 2, 3. The mounting portion 25 in particular may be configured for being mounted to the fuselage 4, to a wing 6, or to a gear 10, 11 of the aircraft 2, 3.

Each of the exterior aircraft lights 12, 14 further comprises a cooling device 48, such as cooling ribs, for dissipating heat from the exterior aircraft light 12, 14. The at least one cooling device 48 may be formed integrally with the housing 24, or it may be mounted to the housing 24 of the exterior aircraft light 12, 14.

Each of the exterior aircraft lights 12, 14 comprises at least one light source 26. The exterior aircraft light 12, 14 in particular may comprise a plurality of identical or different light sources 26, and the exterior aircraft light 12, 14 may be switched between different operating modes by selectively activating and deactivating selected light sources 26. The at least one light source 26 may be an LED or comprise one or more LEDs, in particular an array of LEDs. Switching between different operating modes in particular may include changing the number and/or the type of light sources 26/LEDs which are switched on.

Each of the exterior aircraft lights 12, 14 further comprises an at least partially transparent cover 28 allowing the light emitted by the at least one light source 26 to exit from the housing 24. The at least partially transparent cover 28 in particular may be an optical element such as a lens or a Fresnel lens configured for shaping a beam of light emitted by the respective exterior aircraft light 12, 14. Additionally or alternatively, exterior aircraft lights 12, 14 according to exemplary embodiments of the invention may comprise at least one light reflector, which is not shown in FIG. 4.

Each of the exterior aircraft lights 12, 14 comprises at least one sensor 30 configured for detecting current operational conditions of the respective exterior aircraft light 12, 14.

The at least one sensor 30 for example may include at least one optical sensor 30 configured for detecting light reflected towards the aircraft 2, 3. Evaluating the signal provided by such an optical sensor 30 may be used for determining whether there is a considerable risk that a pilot of the aircraft 2, 3 is blinded by light reflected towards the aircraft 2, 3. This may include light which is reflected by fog, wet surfaces, such as a wet runway 1, and/or objects 9, such as trees, located close to the aircraft 2, 3.

Alternatively or additionally, the at least one sensor 30 may include at least one flight state sensor 30 which is configured for detecting the current flight state of the aircraft 2, 3. This in particular may include detecting whether the aircraft 2, 3 is rising, in particular starting, or descending, in particular landing, the current height of the aircraft 2, 3 and/or the current orientation of the aircraft 2, 3, defined by pitch, yaw and roll angles, in space.

Alternatively or additionally, the at least one sensor 30 may include at least one environmental sensor 30 configured for determining parameters of the environment close to the aircraft 2, 3. These parameters for example may include the temperature outside the aircraft 2, 3, the humidity of the air outside the aircraft 2, 3 and/or the air pressure outside the aircraft 2, 3.

The at least one sensor 30 may be arranged inside the housing 24 of the exterior aircraft light 12, 14, as illustrated in FIG. 4. Alternatively or additionally, the at least one sensor 30 may be arranged outside the housing 24 of the exterior aircraft light 12, 14. The at least one sensor 30 further may include sensors 30 which are arranged in some distance from the exterior aircraft light 12, 14, e.g. in the fuselage 4 of the aircraft 2, 3 and/or close to or within the engines 8 of the aircraft 2, 3.

Each of the exterior aircraft lights 12, 14 comprises a controller 32 including an operating mode selector 33. The operating mode selector 33 is configured for receiving at least one sensor signal provided by the at least one sensor 30 and for determining, based on the at least one received sensor signal, an operational state of the at least one light source 26 resulting in a light emission of the respective exterior aircraft lights 12, 14 which is well adapted to the current operational state of the aircraft 2, 3.

The operating mode selector 33, for example, may be configured for reducing the amount of light emitted by the respective exterior aircraft light 12, 14 in case the at least one sensor signal provided by the at least one sensor 30 indicates the there is a considerable risk that emitting light with a high intensity will result in blinding the pilot due to light reflections.

In addition to the at least one sensor signal received from the at least one sensor 30, the determination and calculation made by the operating mode selector 33 may be based on further input data, such as manual data/commands provided by the pilot or a flight computer 44 of the aircraft 2, 3. The transmission of such input data to the controller 32 will be described in more detail further below.

The operating mode selector 33 is also configured for determining the amount of electric power needed by the at least one light source 26 for being operated in the determined operating mode and generating the desired light emission.

The controller 32 further comprises a transmitter 34, which is configured for transmitting a power request signal to the electric power supply 16, in particular to a corresponding receiver 36 associated with the electric power supply 16. The power request signal indicates the amount of electric power necessary for operating the at least one light source 26 in the operating mode set by the operating mode selector 33.

The electric power supply 16 comprises a control circuit 46. The control circuit 46 is configured for controlling the electric power supply 16 to supply electric power to the exterior aircraft light 12, 14 in correspondence with the received power request signal.

The control circuit 46 may be implemented in hardware, i.e. as an electronic circuit. The control circuit 46 in particular may include an application-specific integrated circuit (ASIC) customized for the respective tasks. Additionally or alternatively, the control circuit 46 may include a programmable (micro-)processor, which is controlled by an appropriate program for executing the desired tasks.

By supplying exactly or close to the necessary amount of electric power to the exterior aircraft light 12, 14, the amount of waste heat generated at the exterior aircraft light 12, 14, which needs to be dissipated by the cooling device 48, is considerably reduced.

Since the amount of waste heat is reduced, the efficiency of the aircraft light assembly 22 is enhanced and the cooling capacity of the at least one cooling device 48 may be smaller than in a conventional configuration. Further, the thermal stress for the components of the exterior aircraft lights 12, 14, in particular the at least one light source 26, is reduced. This may help to prolong the lifetime of these components.

The transmitter 34 may be configured for transmitting the power request signal via the electric power line 18 connecting the exterior aircraft light 12, 14 with the electric power supply 16. The transmitter 34 in particular may be configured for generating and transmitting a high frequency signal, which is transmitted to the corresponding receiver 36 via the electric power line 18. The high frequency carrier signal, onto which the power request information is modulated, may have a frequency in the range of 1.75 MHz to 13 MHz.

Alternatively, the power request signal may be transmitted via a separate data line 38 extending between the transmitter 34 and the receiver 36, or via a wireless data connection.

The power request signal may include parameters representing at least one of a desired voltage, a desired current, a desired frequency and/or a desired duty cycle of the electric power supplied the exterior aircraft light 12, 14, or any combination of these parameters.

The controller 32 may further comprise a transceiver 40 configured for receiving control signals from the electric power supply 16 or from an aircraft controller 44. The aircraft controller 44 may be part of the aircraft light assembly 22, but generally it is not.

The aircraft controller 44 may include a flight computer and/or a manual control located in the cockpit 5 of the aircraft 2, 3 allowing the pilot to provide manual input to the controller 32.

The transceiver 40 may be configured for receiving the control signals from the electric power line 18, from a separate data line 38 or via a wireless data connection. The control signals may be transmitted similar to the power request signal as high frequency signals over the electric power line 18. Alternatively, the control signals may be transmitted by controlling the electric power supplied to the exterior aircraft light 12, 14 ignoring the power request signal provided by the controller 32.

For example, the electric power supply 16 may supply full electric power to the exterior aircraft light 12, 14 due to a manual input by the pilot although the operating mode selector 33 calculated a smaller electric power demand. By receiving full electric power, the controller 32 recognizes that operating the at least one light source 26 with full power resulting in maximum light intensity is requested. Thus, the power request signal provided by the operating mode selector 33 is ignored (overridden) and the exterior aircraft light 12, 14 is operated with full electric power.

The controller 32 may further comprise a memory 42 configured for storing data, in particular operation log data documenting the operational history of the aircraft light source 12, 14. The data stored within the memory 42 may be used for maintenance purposes and/or for error tracing. Data stored within the memory 42 in particular may be used for determining whether at least one of the light sources 26 needs to be replaced as it has reached the end of its lifetime.

The controller 32 may be implemented in hardware, i.e. as an electronic circuit. The controller 32 in particular may include an application-specific integrated circuit (ASIC) customized for the respective tasks. Additionally or alternatively, the controller 32 may include a programmable (micro-)processor, which is controlled by an appropriate program for executing the desired tasks. Also, the operating mode selector 33 may be implemented in hardware, i.e. as an electronic circuit. The operating mode selector 33 in particular may include an application-specific integrated circuit (ASIC) customized for the respective tasks. Additionally or alternatively, the operating mode selector 33 may include a programmable (micro-)processor, which is controlled by an appropriate program for executing the desired tasks. The controller 32 and the operating mode selector 33 may share some or all of the same resources or may be separate entities.

The aircraft light in accordance with exemplary embodiments of the invention may have a power conversion efficiency of more than 95%. As compared to previous approaches, substantial power savings may be achieved. In particular, the power conversion losses of previous light units, which were in the range of 20%, may be substantially reduced or eliminated. For the exemplary case of an aircraft light with a nominal power rating of 150 W, substantial reductions of power losses and, thus, substantial improvements in cooling efficiency may be achieved.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed, but that the invention will include all embodiments falling within the scope of the appended claims.

What is claimed is:

1. An aircraft light comprising:
   at least one light source;
   at least one sensor configured for detecting current operational conditions and providing at least one corresponding sensor signal;
   an operating mode selector configured for determining a suitable light emission of the at least one light source based on the at least one sensor signal; wherein the operating mode selector is further configured for determining the amount of electrical power needed for generating the determined light emission; and
   a transmitter configured for transmitting a power request signal from the operating mode selector to a power supply, which is not part of the aircraft light but spaced apart from the aircraft light, the power request signal indicating the determined amount of electrical power to the power supply;
   wherein the transmitter is configured for transmitting the power request signal via a dedicated data line, or wherein the transmitter is configured for transmitting the power request signal via a wireless data connection, or wherein the transmitter is configured for transmitting the power request signal as a high-frequency signal via an electric power line which is configured for supplying electrical power to the aircraft light.

2. The aircraft light according to claim 1, wherein the operational conditions include flight and/or environmental conditions.

3. The aircraft light according to claim 1, wherein the power request signal includes information about at least one of an electrical voltage, an electrical current, a frequency and a duty cycle of the electrical power to be supplied to the aircraft light.

4. The aircraft light according to claim 1, wherein the transmitter is further configured for transmitting additional data, wherein said additional data in particular includes information about the health of the at least one light source and/or information about the operational history of the aircraft light.

5. The aircraft light according to claim 1, further comprising a transceiver configured for receiving a control signal, in particular a manual control signal, wherein the operating mode selector is configured to modify the determined light emission based on the control signal received by the transceiver.

6. The aircraft light according to claim 5, wherein the transceiver is configured for receiving the control signal via an electric power line configured for supplying electrical power to the aircraft light.

7. The aircraft light according to claim 1, further comprising:
   a memory configured for storing data, in particular operation log data representing the operational history of the at least one light source.

8. The aircraft light according to claim 1, wherein the at least one light source includes at least one LED.

9. An aircraft light assembly comprising:
   at least one aircraft light according to claim 1; and
   an electric power supply, which is not part of the aircraft light but spaced apart from the aircraft light and configured for supplying electrical power to the at least one aircraft light, the electric power supply comprising:
   a receiver configured for receiving the power request signal; and
   a control circuit configured for controlling the electrical power supplied to the at least one aircraft light according to the received signal.

10. An aircraft comprising:
    at least one aircraft light assembly according to claim 9, wherein the at least one aircraft light is at least one of a landing light, a taxi light, a runway turn-off light, and a take-off light, or multi-purpose exterior aircraft light combining the functionality of at least two of a landing light, a taxi light, a runway turn-off light and a take-off light.

11. The aircraft according to claim 10, wherein the electric power supply is arranged in a thermally controlled area of the aircraft.

12. The aircraft according to claim 10, wherein the aircraft is an airplane or a helicopter.

* * * * *